(12) United States Patent
Lin

(10) Patent No.: US 11,619,251 B2
(45) Date of Patent: Apr. 4, 2023

(54) TELESCOPIC MODULE

(71) Applicants: HI-MAX INNOVATION CO., LTD., Taichung (TW); Yi Chen Tseng, Taichung (TW)

(72) Inventor: Jhih Fan Lin, Taichung (TW)

(73) Assignees: Yi-Cben Tseng, Taichung (TW); Hi-Max Innovation Co., Ltd., Taichung (TW)

(*) Notice: Subject to any disclaimer, the term of this patent is extended or adjusted under 35 U.S.C. 154(b) by 0 days.

(21) Appl. No.: 17/646,149

(22) Filed: Dec. 28, 2021

(65) Prior Publication Data

US 2022/0120303 A1 Apr. 21, 2022

Related U.S. Application Data

(60) Continuation-in-part of application No. 16/869,570, filed on May 7, 2020, now abandoned, which is a division of application No. 15/664,598, filed on Jul. 31, 2017, now Pat. No. 10,760,604.

(51) Int. Cl.
*F16B 7/14* (2006.01)
*A47B 9/20* (2006.01)

(52) U.S. Cl.
CPC ............. *F16B 7/1436* (2013.01); *A47B 9/20* (2013.01); *A47B 2200/0052* (2013.01); *Y10T 403/32516* (2015.01)

(58) Field of Classification Search
CPC ............. A47B 9/20; A47B 2200/0052; A47B 2200/0053; F16B 7/1409; F16B 7/1436; F16C 33/04; F16C 33/08; F16C 33/37; F16C 33/3713; F16C 33/372; F16C 33/4605; F16C 33/4688; Y10T 403/32467; Y10T 403/32516
USPC ........................................... 403/109.1, 109.7
See application file for complete search history.

(56) References Cited

U.S. PATENT DOCUMENTS

| | | | | |
|---|---|---|---|---|
| 3,887,247 A * | 6/1975 | Graae | ...................... | F16B 7/10 384/53 |
| 6,189,843 B1 * | 2/2001 | Pfister | ..................... | A47B 9/083 248/161 |
| 6,378,816 B1 * | 4/2002 | Pfister | ..................... | F16C 29/04 248/161 |
| 7,424,833 B2 * | 9/2008 | Fich | ....................... | F16B 7/1436 108/147.19 |
| 9,743,755 B2 * | 8/2017 | Lin | ........................... | F16B 7/10 |
| 10,342,327 B2 * | 7/2019 | Lin | ........................... | A47B 9/20 |
| 10,537,172 B2 * | 1/2020 | Lin | ........................... | A47B 9/20 |
| 10,595,629 B2 * | 3/2020 | Ko | ........................... | A47B 9/20 |
| 2022/0333581 A1 * | 10/2022 | Lee | ....................... | F16B 7/1409 |

FOREIGN PATENT DOCUMENTS

| | | | | |
|---|---|---|---|---|
| GB | 2175974 A | * | 12/1986 | ............ F16B 7/1409 |
| WO | WO-2018072187 A1 | * | 4/2018 | ............... A47B 9/20 |

* cited by examiner

*Primary Examiner* — Josh Skroupa
(74) *Attorney, Agent, or Firm* — Wang Law Firm, Inc.

(57) ABSTRACT

A telescopic module includes a first tube, a second tube, a holder, and a plurality of rollers. The first tube has a passageway. The second tube is received in the passageway of the first tube for reciprocation. The holder is mounted on the first tube. The rollers are pivoted on the holder to rest against the second tube or the first tube, or both to touch an inner side of the first tube and an outer side of the second tube to be turned when the second tube is moving.

7 Claims, 6 Drawing Sheets

TELESCOPIC MODULE

CROSS-REFERENCE TO RELATED APPLICATIONS

The present application is a Continuation-In-Part application of U.S. application Ser. No. 16/869,570, filed on May 7, 2020, which is a divisional application of U.S. application Ser. No. 15/664,598, filed on Jul. 31, 2017, the entire disclosure of which are incorporated herein by reference.

BACKGROUND OF THE INVENTION

1. Technical Field

The present invention relates to a desk or a chair, and more particularly to a telescopic module of a desk or a chair for elevating and lowering a work surface.

2. Description of Related Art

Typically, a conventional desk has a consistent height of a work surface, and a user may sit on a chair to read, write, or operate a computer on the desk. However, heights of people are different, so that the desk and chair with a consistent height can't meet all heights of the users.

An improved desk has a telescopic stand to adjust its height. The conventional telescopic stand has an inner tube and an outer tube to elevate or lower the work surface by moving the inner tube, and fix the inner tube to the outer tube when the telescopic stand is adjusted to a desired length. The same structure of the telescopic stand may be incorporated in a chair.

It is easy to understand that a friction is occurred between the inner tube and the outer tube when the telescopic stand is telescoped. In order to reduce the friction, a ring is provided between the inner tube and the outer tube. Typically, the ring is fixed to the outer tube, so there still is a relative motion between the ring and the inner tube. It may wear the ring, and make it lose the function of reducing the friction. The worn ring causes an unstable telescoping motion of the telescopic stand as well.

An improved telescopic stand is provided with ribs on an inner side of the outer tube or an outer side of the inner tube instead of the ring. The ribs may reduce the friction between the inner tube and the outer tube. However, the inner tube and the outer tube still will be worn after a long time of operation.

BRIEF SUMMARY OF THE INVENTION

In view of the above, the primary objective of the present invention is to provide a telescopic module, which has a small friction and a stable movement when the telescopic module is elevated or lowered.

The secondary objective of the present invention is to provide a telescopic module, which may reduce the wear of the elements of the telescopic module.

In order to achieve the objective of the present invention, a telescopic module includes a first tube, second tube, a holder, and a plurality of rollers. The first tube has a passageway. The second tube is received in the passageway of the first tube for reciprocation. The holder is mounted on the first tube. The rollers are pivoted on the holder to rest against the first tube or the second tube. The rollers touch at least one of an inner side of the first tube and an outer side of the second tube to be turned when the second tube is moving. Wherein at least one of the rollers has two first members, a second member, and a shaft. The second member has opposite ends which engage the first members respectively. The shaft passes through the first members and second member, and opposite ends of the shaft are connected to the holder.

The rollers may reduce the friction between the first and the second tubes when the second tube is moving.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
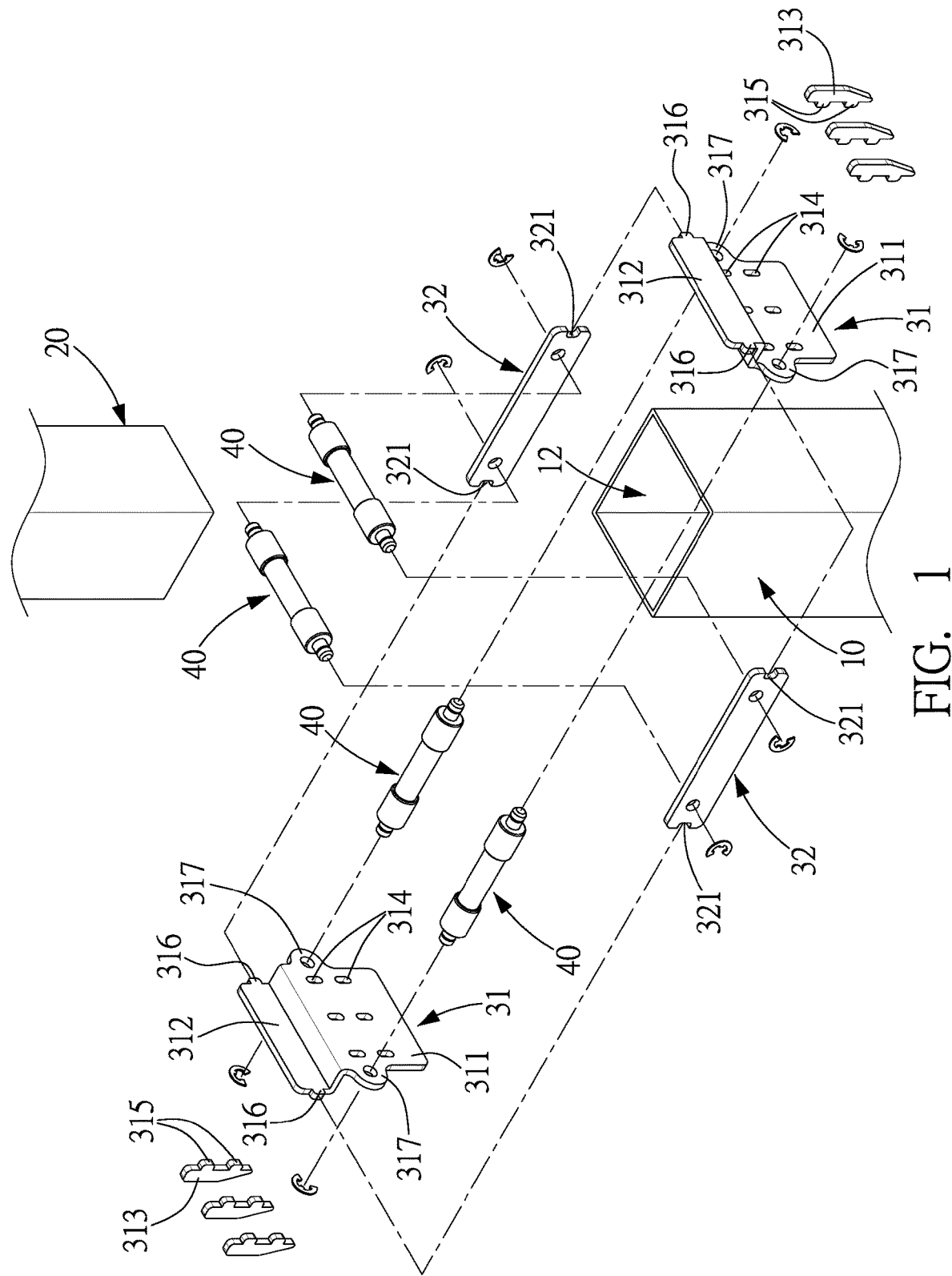
FIG. 1 is an exploded view of a preferred embodiment of the present invention.
Figure 2:
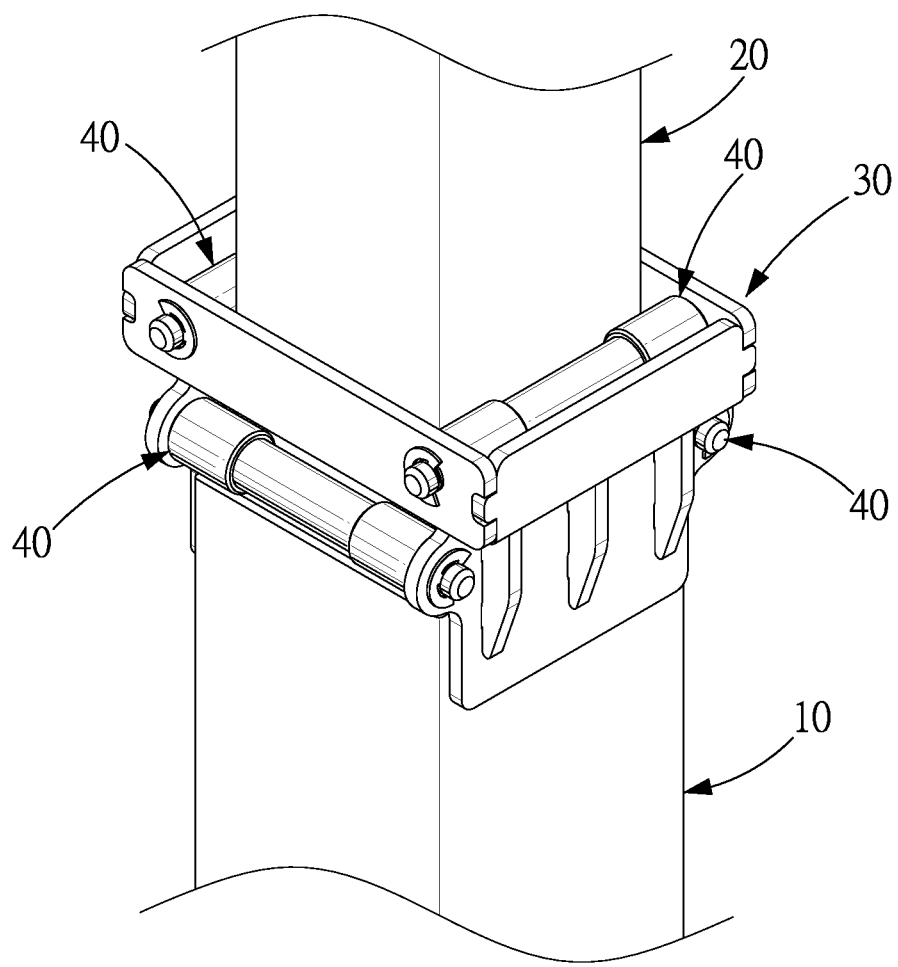
FIG. 2 is a perspective view of the preferred embodiment of the present invention.

FIG. 1 and FIG. 2 show a telescopic module of the preferred embodiment of the present invention, which is connected to a work surface to adjust a height of the work surface. The telescopic module may be incorporated into a desk, a chair, or any other devices which is able to elevate and lower the work surface. It is noted that usually there are a plurality of the telescopic modules are incorporated.

The telescopic module of the preferred embodiment of the present invention includes a first tube 10 and a second tube 20. The first tube 10 has a passageway 12, in which the second tube 20 is received for free reciprocation. A holder 30 is connected to the first tube 10, and four rollers 40 are pivoted on the holder 30 and touch the second tube 20.

The holder 30 includes two base members 31 and two connecting members 32. Each of the base members 31 has a fixed portion 311, a holding portion 312, and three ribs 313. The fixed portion 311 is a plate, and the holding portion 312 is a L-shaped plate connected to an end of the fixed portion 311. In practices, the fixed portion 311 and the holding portion 312 are made into a single element. The fixed portion 311 is fixed to an outer side of the first tube 10 by welding to have the holding portion 312 exceeding an end of the first tube 10. The fixed portion 311 is provided with a plurality of bores 314. The ribs have pins 315 on an end thereof to be inserted into the bores 314 for fixing the ribs 313 to the fixed portion 311. Of course, welding is applied to the ribs 313 to strengthen the connection of the ribs 313 and the fixed portion 311. Ends of the ribs 313 touch the holding portion 312 to enhance the strength of the base member 31. The other base members 31 is fixed to an opposite side of the first tube 10 with the holding portions 312 facing each other. Each of the holding portions 312 has two protrusions 316 on opposite ends thereof, and the connecting members 32 has two slot 321 accordingly. The connecting members 32 are connected to the holding portions 312 by the protrusions 316 engaging the slots 321. As a result, the connecting members 32 and the holding portions 312 form a rectangular frame.

Figure 3:
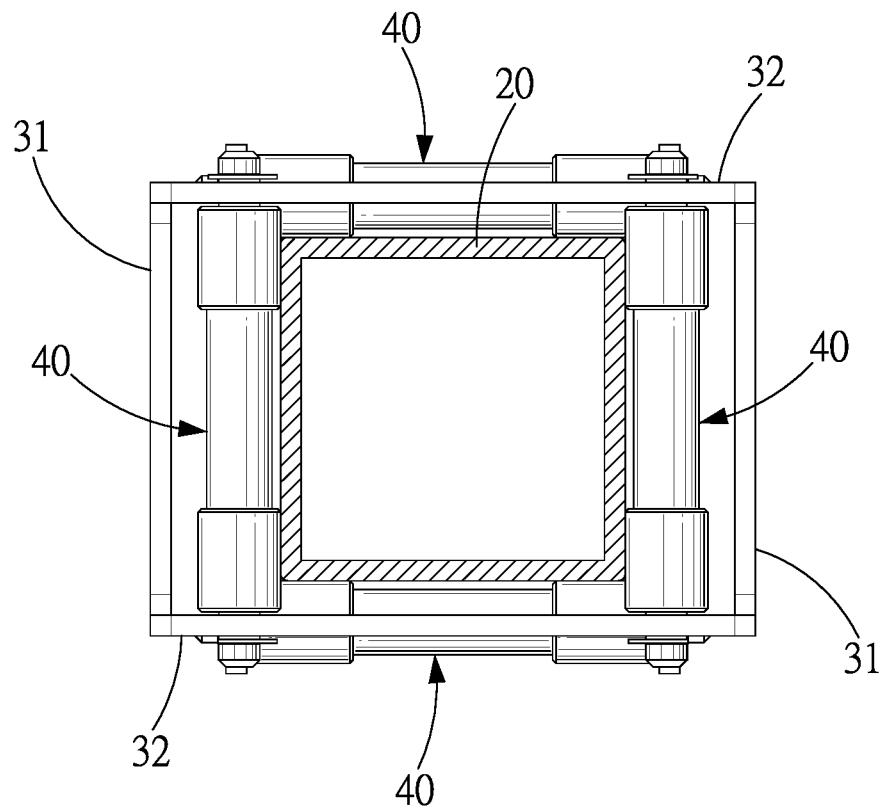
FIG. 3 is a top view of the preferred embodiment of the present invention.

As shown in FIG. 3, each of the base members 31 has two pivoting bases 317 on a left and a right ends of the base member 31. Two of the rollers 40 are connected to the pivoting bases 317 on the same side of the base members 31, and the other two rollers 40 are connected to the connecting members 32. Therefore, the rollers 40 are between the base members 31 and under the connecting members 32, and the other two rollers 40 are between the connecting members 32 and enclosed by the holding portion 312.

Figure 4:
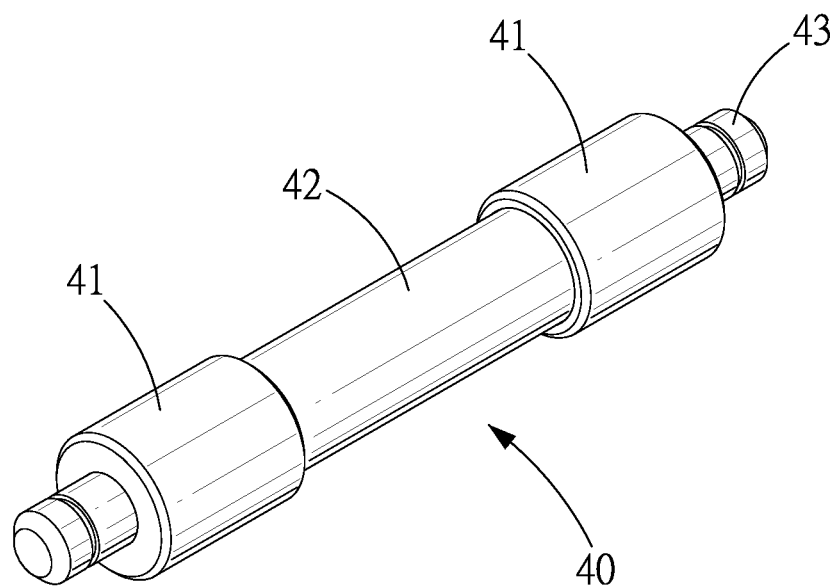
FIG. 4 is a perspective view of the roller of the preferred embodiment of the present invention.
Figure 5:
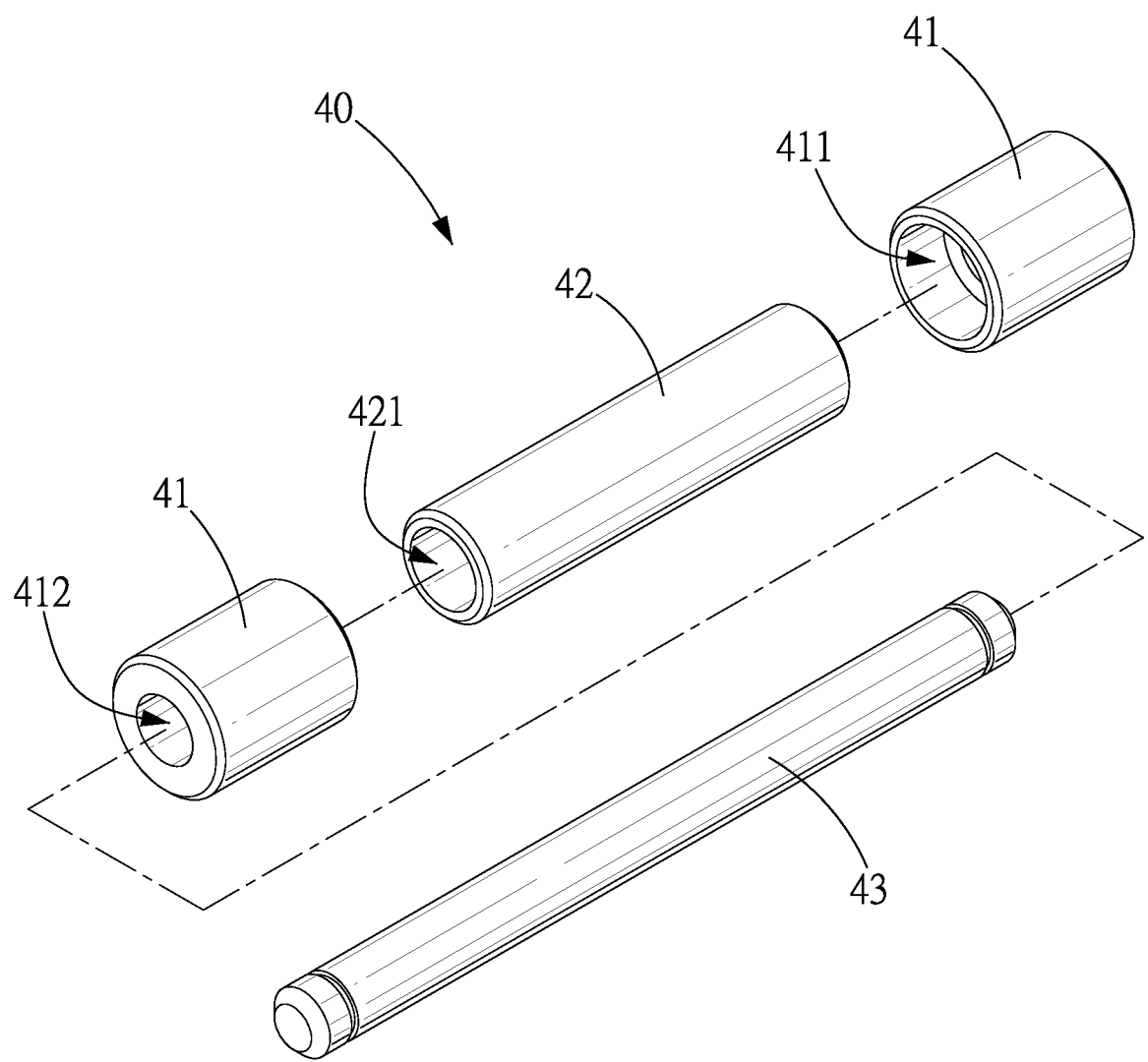
FIG. 5 is an exploded view of the rollers of the preferred embodiment of the present invention, showing the telescopic module telescoping.
Figure 6:
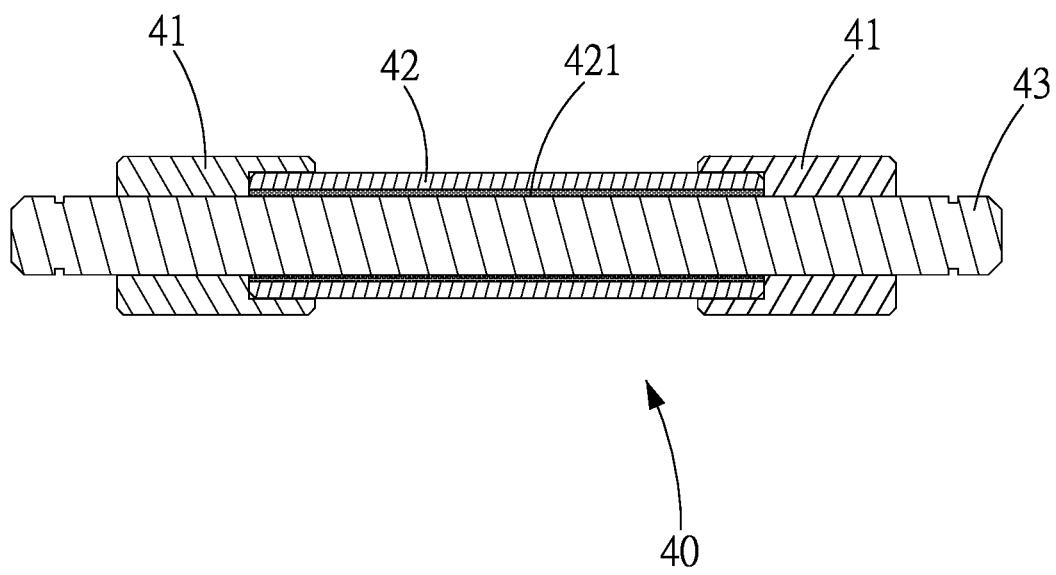
FIG. 6 is a sectional view of the roller of the preferred embodiment of the present invention.

As shown in FIGS. 4-6, in the present embodiment each of the rollers 40 has two first members 41, a second member 42, and a shaft 43. Each of the first members 41 is a cylinder with a cavity 411 on an end and a shaft bore 412 on the other end, and the shaft bore 412 is communicated with the cavity 411. The second member 42 is cylinder with a diameter smaller than that of the first members 41. The second member 42 has a channel 421 which is open on opposite ends thereof. The opposite ends of the second member 42 are received in the cavities 411 of the first members 41, and the shaft 43 passes through the shaft bore 412 of the first member 41, the channel 421 of the second member 42, and the shaft bore 412 of the other first member 41 in sequence. The diameter of the shaft bores 412 of the first members 41 are larger than that of the shaft 43, so that a small interval is left between the first members 41 and the shaft 43 when the shaft 43 engages the shaft bores 412. Both the first members 41 rotate freely relative to the shaft 43. The channel 421 is larger than the shaft 43, so that a space is left between a sidewall of the channel 421 and the shaft 43. In the present embodiment, the space is filled with lubricant. The second member 42 rotates freely relative to the shaft 43.

The rollers 40 are connected to the holder 30 by the shaft 43. Precisely, two of the rollers 40 are connected to the pivoting bases 317 of the base members 31 with the shafts 43 of which engaging holes thereon, and the other two rollers 40 are connected to the connecting members 32 with the shafts 43 of which engaging the holes thereon. The first members 41 of the rollers 40 rest against the second tube 20. As a result, the rollers 40 may support the second tube 20 and reduce the friction when the second tube 20 moves.

It must be pointed out that the embodiments described above are only some preferred embodiments of the present invention. All equivalent structures which employ the concepts disclosed in this specification and the appended claims should fall within the scope of the present invention.

What is claimed is:

1. A telescopic module, comprising:
    a first tube having a passageway therein;
    a second tube received in the passageway of the first tube for reciprocation;
    a holder mounted on the first tube; and
    a plurality of rollers pivoted on the holder to rest against the first tube;
    wherein at least one of the rollers has two first members, a second member, and a shaft; the second member has opposite ends engaging the first members respectively; the shaft passing through the first members and second member, and opposite ends of the shaft are connected to the holder;
    wherein the holder has two base members and two connecting members; the base members are connected to the first tube, and the connecting member have opposite ends connected to the base member respectively;
    wherein each of the base members has a holding portion to receive the rollers connected to the connecting members;
    wherein each of the base members further has a fixed portion, to which the holding portion is fixed; the fixed portions of the base members are fixed to the first tube.

2. The telescopic module of claim 1, wherein the second member has a channel in which the shaft is received; a diameter of the channel is larger than that of the shaft to receive lubricant therein.

3. The telescopic module of claim 1, wherein the second member has a diameter smaller than that of the first members.

4. The telescopic module of claim 1, wherein each of the first members has a cavity to receive the ends of the second member.

5. The telescopic module of claim 1, wherein two of the rollers are connected to the connecting members, and another two of the rollers are connected to the base members.

6. The telescopic module of claim 1, wherein each of the base members further has a rib fixed to the fixed portion and against the holding portion.

7. The telescopic module of claim 6, wherein the rib has a pin to be inserted into a bore on the fixed portion.

\* \* \* \* \*